US012701386B2

(12) United States Patent
Paul et al.

(10) Patent No.: US 12,701,386 B2
(45) Date of Patent: Aug. 4, 2026

(54) DETERMINING LOCATION USING BLE SIGNALS

(71) Applicant: HID Global Corp., Austin, TX (US)

(72) Inventors: Srinjay Paul, Albuquerque, NM (US); Robert Kjell Rowe, Poulsbo, WA (US); Mark Robinton, Eden Prairie, MN (US); Matthew Johnson, Parkland, FL (US)

(73) Assignee: HID Global Corp., Austin, TX (US)

( * ) Notice: Subject to any disclaimer, the term of this patent is extended or adjusted under 35 U.S.C. 154(b) by 312 days.

(21) Appl. No.: 18/392,289

(22) Filed: Dec. 21, 2023

(65) Prior Publication Data

US 2025/0211935 A1      Jun. 26, 2025

(51) Int. Cl.
*H04W 4/02*      (2018.01)
*H04W 4/80*      (2018.01)

(52) U.S. Cl.
CPC ............... *H04W 4/02* (2013.01); *H04W 4/80* (2018.02)

(58) Field of Classification Search
CPC ........... H04W 4/02; H04W 4/80; G01S 5/017; G01S 5/0244; G01S 5/14; G01S 5/0278
USPC ........................................................ 455/41.2
See application file for complete search history.

(56) References Cited

U.S. PATENT DOCUMENTS

| | | | |
|---|---|---|---|
| 11,096,008 B1 | 8/2021 | Batten | |
| 2014/0228044 A1* | 8/2014 | Jones, Jr. ................... | G01S 5/02 342/386 |

| | | | |
|---|---|---|---|
| 2017/0202180 A1* | 7/2017 | Yang .................... | G08B 29/186 |
| 2018/0292216 A1* | 10/2018 | Jimenez Gonzalez | ..................... G01C 21/206 |
| 2020/0141735 A1* | 5/2020 | Iqbal ...................... | H04W 4/80 |
| 2024/0142563 A1 | 5/2024 | Chu et al. | |

FOREIGN PATENT DOCUMENTS

| | | |
|---|---|---|
| TW | I819868 | 10/2023 |
| WO | 2023281506 | 1/2023 |
| WO | 2025136758 | 6/2025 |

OTHER PUBLICATIONS

"International Application Serial No. PCT US2024 059522, International Search Report mailed Mar. 24, 2025", 4 pages.
"International Application Serial No. PCT US2024 059522, Written Opinion mailed Mar. 24, 2025", 5 pages.

(Continued)

*Primary Examiner* — Don N Vo

(74) *Attorney, Agent, or Firm* — Schwegman Lundberg & Woessner, P.A.

(57)      ABSTRACT

Methods and systems are provided for performing operations including: receiving a plurality of Bluetooth Low Energy (BLE) signals from a BLE beacon associated with an object over a period of time; generating a series of spatial patterns based on Received Signal Strength Indicators (RSSI) associated with the BLE signals; processing the series of spatial patterns by a first machine learning model to select a portion of the series of spatial patterns for use in determining a location of the object; and determining the location of the object based on the selected portion of the series of spatial patterns associated with the BLE signals.

19 Claims, 5 Drawing Sheets

(56)  References Cited

OTHER PUBLICATIONS

Guanglin, Tang, "Balancing Robustness and Responsiveness in a Real-time Indoor Location System using Bluetooth Low Energy Technology and Deep Learning to Facilitate Clinical Applications", Arxiv.Org, Cornell University Library, 201 Olin Library Cornell University Ithaca, NY 14853, (Jul. 24, 2019).

Baek, Seung Hyo, "The trilateration-based BLE Beacon system for analyzing user-identified space usage of New Ways of Working offices", [Online]. Retrieved from the Internet: https: www. sciencedirect.com science article abs pii S036013231830773X, (Accessed online Dec. 18, 2023), 7 pages.

Ryu, Seung Ho, "Development of an occupancy prediction model using indoor environmental data based on machine learning techniques", [Online]. Retrieved from the Internet: https: www. sciencedirect.com science article abs pii S0360132316302463, (Accessed online Dec. 18, 2023), 6 pages.

* cited by examiner

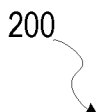
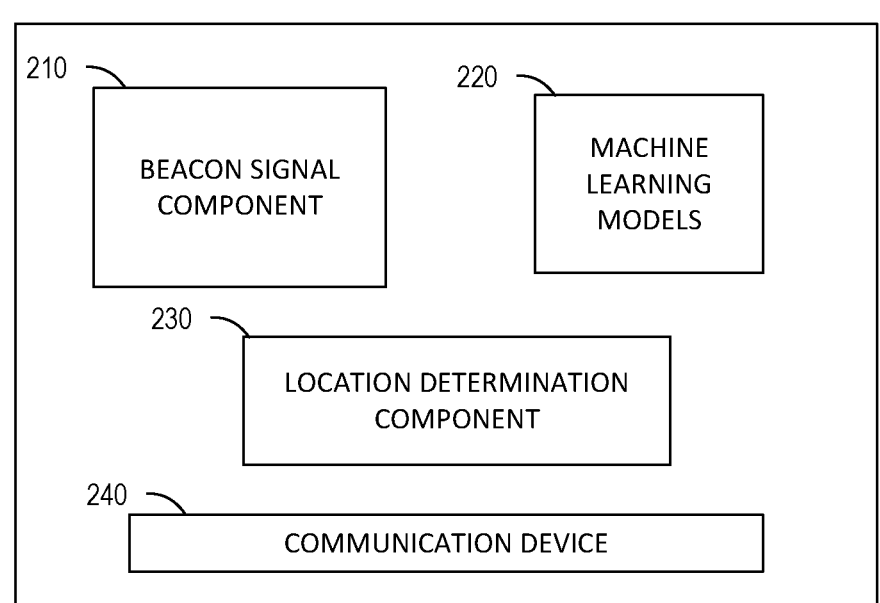
200
210 — BEACON SIGNAL COMPONENT
220 — MACHINE LEARNING MODELS
230 — LOCATION DETERMINATION COMPONENT
240 — COMMUNICATION DEVICE
*FIG. 2*

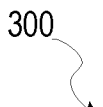

300

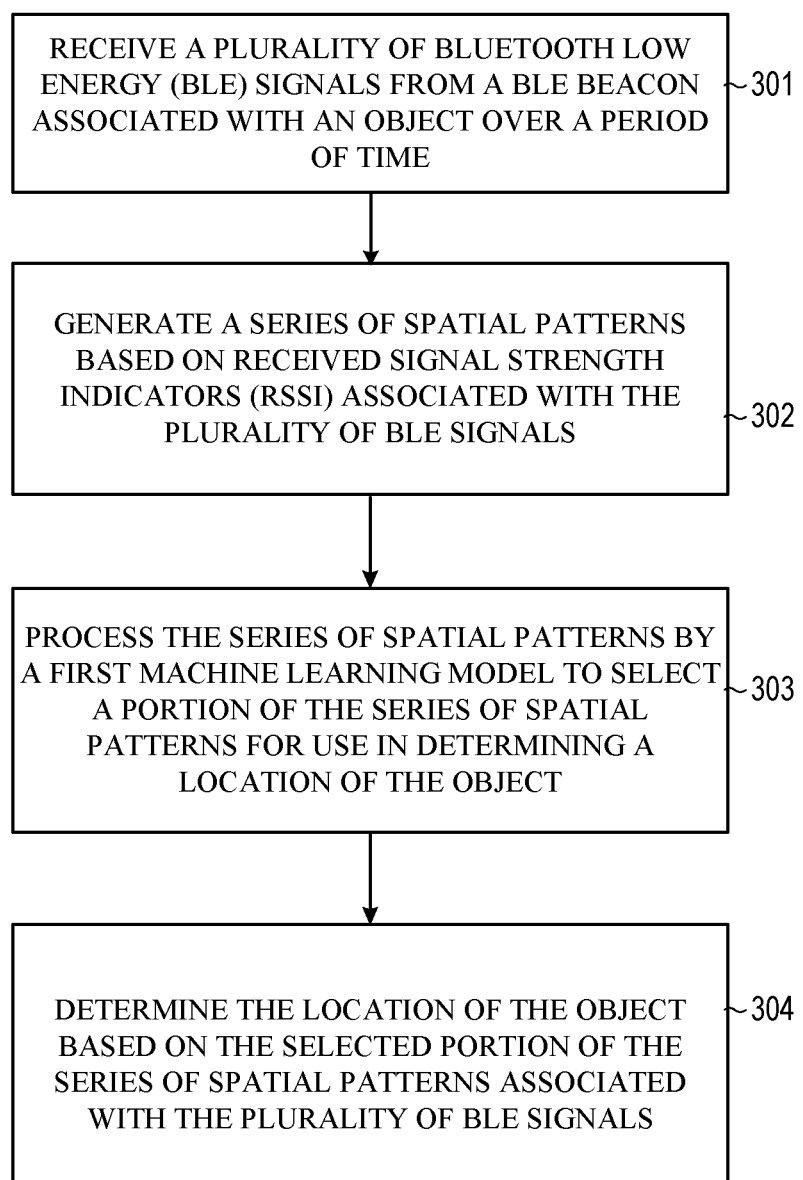

RECEIVE A PLURALITY OF BLUETOOTH LOW ENERGY (BLE) SIGNALS FROM A BLE BEACON ASSOCIATED WITH AN OBJECT OVER A PERIOD OF TIME ~301

GENERATE A SERIES OF SPATIAL PATTERNS BASED ON RECEIVED SIGNAL STRENGTH INDICATORS (RSSI) ASSOCIATED WITH THE PLURALITY OF BLE SIGNALS ~302

PROCESS THE SERIES OF SPATIAL PATTERNS BY A FIRST MACHINE LEARNING MODEL TO SELECT A PORTION OF THE SERIES OF SPATIAL PATTERNS FOR USE IN DETERMINING A LOCATION OF THE OBJECT ~303

DETERMINE THE LOCATION OF THE OBJECT BASED ON THE SELECTED PORTION OF THE SERIES OF SPATIAL PATTERNS ASSOCIATED WITH THE PLURALITY OF BLE SIGNALS ~304

*FIG. 3*

DETERMINING LOCATION USING BLE SIGNALS

BACKGROUND

Real time location systems (RTLS) leverage radio-frequency (RF) signals transmitted by RF beacons, such as Bluetooth Low Energy (BLE) beacons to determine object locations. These RTLS systems distribute anchors through a physical environment. The RTLS system can perform various RF signals processing, such as triangulation, to detect the current location of the RF beacon.

SUMMARY

In some aspects, the techniques described herein relate to a method including: receiving a plurality of Bluetooth Low Energy (BLE) signals from a BLE beacon associated with an object over a period of time; generating a series of spatial patterns based on Received Signal Strength Indicators (RSSI) associated with the plurality of BLE signals; processing the series of spatial patterns by a first machine learning model to select a portion of the series of spatial patterns for use in determining a location of the object; and determining the location of the object based on the selected portion of the series of spatial patterns associated with the plurality of BLE signals.

In some aspects, the techniques described herein relate to a method, wherein the plurality of BLE signals is received by a plurality of anchors that are distributed in a physical space.

In some aspects, the techniques described herein relate to a method, wherein the BLE beacon emits periodic RF signals.

In some aspects, the techniques described herein relate to a method, further including: generating a first spatial pattern of the series of spatial patterns based on an RSSI of the periodic RF signals observed by the plurality of anchors at a first timepoint; and generating a second spatial pattern of the series of spatial patterns based on an additional RSSI of the periodic RF signals observed by the plurality of anchors at a second timepoint.

In some aspects, the techniques described herein relate to a method, further including: aggregating the first and second spatial patterns into a spatiotemporal pattern including the series of spatial patterns.

In some aspects, the techniques described herein relate to a method, wherein the series of spatial patterns represent a historical trajectory of the BLE beacon over the period of time.

In some aspects, the techniques described herein relate to a method, wherein the portion of the series of spatial patterns selected by the machine learning model represents a path taken by the BLE beacon.

In some aspects, the techniques described herein relate to a method, wherein the machine learning model is trained to prioritize a first subset of spatial patterns in the series of spatial patterns associated with more recent timepoints.

In some aspects, the techniques described herein relate to a method, wherein the machine learning model is trained to prioritize a second subset of spatial patterns in the series of spatial patterns associated with entry into a geofence associated with an anchor.

In some aspects, the techniques described herein relate to a method, wherein the machine learning model is trained to prioritize a third subset of spatial patterns in the series of spatial patterns associated with a workflow indicator.

In some aspects, the techniques described herein relate to a method, wherein the machine learning model includes a Transformer Encoder Stack Neural Network model.

In some aspects, the techniques described herein relate to a method, wherein the Transformer Encoder Stack Neural Network model is trained to emphasize data sample features pertinent in determining a precise location of an individual BLE beacon at a given time instance.

In some aspects, the techniques described herein relate to a method, further including training the Transformer Encoder Stack Neural Network model in an unsupervised manner by performing training operations including: receiving training data including a set of BLE signals associated with historical patterns obtained from one or more BLE beacons; and processing the training data by the Transformer Encoder Stack Neural Network model to infer a location from the set of BLE signals by selecting the location of an anchor having a relatively stronger RSSI signal in the set of BLE signals from another RSSI signal associated with another timepoint in a sequence.

In some aspects, the techniques described herein relate to a method, further including: training a plurality of machine learning models including the first machine learning model to select different portions of an individual series of spatial patterns based on beacon types.

In some aspects, the techniques described herein relate to a method, further including: determining that the BLE beacon corresponds to a first type of BLE beacon; and selecting the first machine learning model from the plurality of machine learning models for processing the series of spatial patterns in response to determining that the BLE beacon corresponds to the first type of BLE beacon.

In some aspects, the techniques described herein relate to a method, further including: receiving an additional plurality of BLE signals from an additional BLE beacon; generating an additional series of spatial patterns based on RSSI associated with the additional plurality of BLE signals; determining that the additional BLE beacon corresponds to a second type of BLE beacon; and selecting a second machine learning model from the plurality of machine learning models for processing the additional series of spatial patterns in response to determining that the additional BLE beacon corresponds to the second type of BLE beacon.

In some aspects, the techniques described herein relate to a method, further including: processing the additional series of spatial patterns by the second machine learning model to select an additional portion of the additional series of spatial patterns for use in determining an additional location; and determining the additional location based on the selected additional portion of the additional series of spatial patterns associated with the additional plurality of BLE signals.

In some aspects, the techniques described herein relate to a method, wherein the location is determined by a real-time location system (RTLS), wherein the first type of BLE beacon includes at least one of a wristband, a physical badge, or an object tag, and wherein the second type of BLE beacon includes a different one of the wristband, the physical badge, or the object tag.

In some aspects, the techniques described herein relate to a system including: one or more processors configured to perform operations including: receiving a plurality of Bluetooth Low Energy (BLE) signals from a BLE beacon associated with an object over a period of time; generating a series of spatial patterns based on Received Signal Strength Indicators (RSSI) associated with the plurality of BLE signals; processing the series of spatial patterns by a first machine learning model to select a portion of the series of spatial patterns for use in determining a location of the object; and determining the location of the object based on the selected portion of the series of spatial patterns associated with the plurality of BLE signals.

In some aspects, the techniques described herein relate to a non-transitory computer-readable medium including non-transitory computer-readable instructions that, when executed by one or more processors, configure the one or more processors to perform operations including: receiving a plurality of Bluetooth Low Energy (BLE) signals from a BLE beacon associated with an object over a period of time; generating a series of spatial patterns based on Received Signal Strength Indicators (RSSI) associated with the plurality of BLE signals; processing the series of spatial patterns by a first machine learning model to select a portion of the series of spatial patterns for use in determining a location of the object; and determining the location of the object based on the selected portion of the series of spatial patterns associated with the plurality of BLE signals.

BRIEF DESCRIPTION OF THE DRAWINGS

FIG. 2 is a block diagram of example components of the location detection system, according to some examples.

FIG. 3 illustrates example operations of the location detection system, according to some examples.

DETAILED DESCRIPTION

Figure 1:
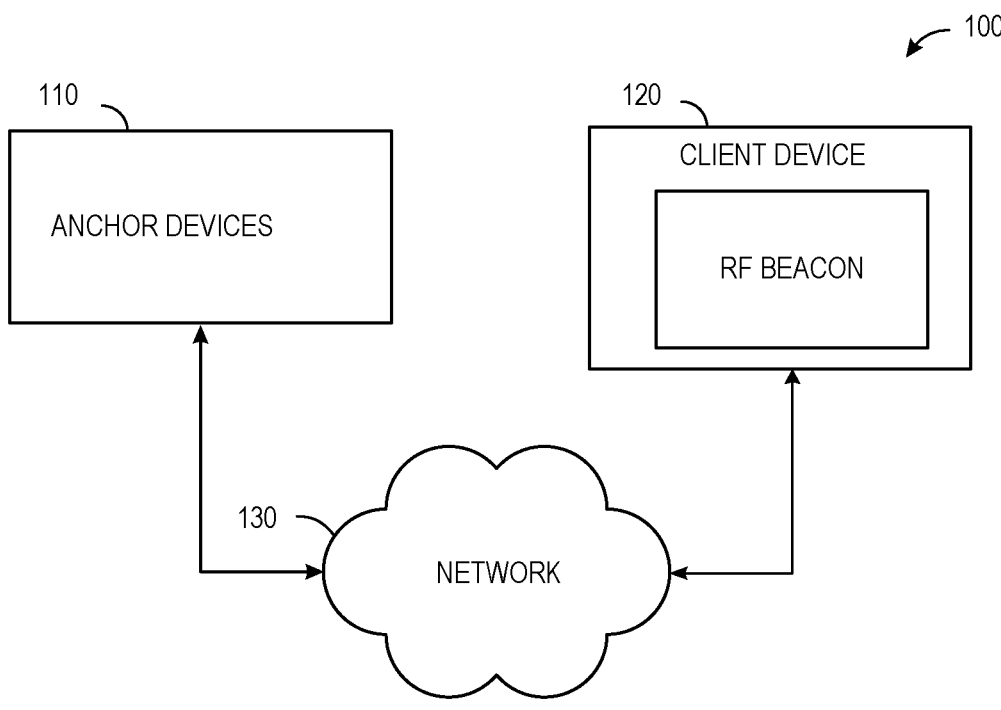
FIG. 1 is a block diagram of an example location detection system, according to some examples.

Example methods and systems for a location detection system are described. In the following description, for purposes of explanation, numerous specific details are set forth in order to provide a thorough understanding of the disclosed examples. It will be evident, however, to one of ordinary skill in the art that examples of the disclosure may be practiced without these specific details.

An RSSI-based RTLS system uses RF signal readers, referred to as anchors, within a BLE framework. These anchors are strategically positioned at pre-determined fixed locations throughout the physical space. The distribution density of these anchors is contingent upon the desired granularity of location estimates to be derived from the system. Beacons can be mobile devices that emit periodic RF signals, which are detected by multiple anchors. An example of a commercially available beacon is the BLU-VISION beacon, the HID beacon, or the BEEK beacon.

The RSSI at each anchor varies based on the distance separating the beacon from the respective anchor. Beacons may be in the form of badges or wristbands that are worn by people, or tags that are adhered to objects such as equipment or supplies. Each beacon transmission is received by multiple anchors, generating a spatial pattern based on the observed RSSI values across these anchors. Each of these transmissions that generate a spatial pattern is considered a discrete timepoint within a dataset. While these patterns convey meaningful data, they exhibit ambiguity when distinguishing nearby locations.

The real-time localization of RF beacons through the utilization of Received Signal Strength Indicator (RSSI) presents a formidable technical challenge. RF signals, notably BLE, exhibit a high susceptibility to environmental noise, arising from diverse sources including signal attenuation due to human body interaction, multipath effects induced by physical surroundings, and communication noise stemming from subtle variances in hardware components and antenna characteristics. The coexistence of multiple noise-inducing factors significantly compromises the accuracy of location estimation, necessitating the application of noise filtering techniques to fulfill the performance requirements of most RTLS applications. Conventional approaches employ diverse filtering methodologies, such as the Kalman filter, median filter, and custom-made filters, albeit at the cost of introducing latency into location estimations, given the necessity for accumulating multiple data points for effective noise reduction. In RTLS use cases requiring timely location estimates, these methods prove suboptimal. Exploratory alternatives, like auxiliary systems operating in conjunction with RTLS, introduce an additional layer of complexity, requiring supplementary hardware, software, and operational resources, thereby incurring substantial cost overhead.

Conventional artificial intelligence (AI) models tailored for temporal data, such as Recurrent Neural Networks (RNNs), lack the flexibility to selectively focus on subsets within an input sequence and the relationships between these subsets over significant temporal distances. Consequently, when handling RTLS data, their performance tends to be suboptimal. Due to the complexities mentioned above and other challenges, such as the susceptibility of the system to degradation from various noise sources, the impracticality of obtaining labeled training data, and the lack of suitable unsupervised/self-supervised training techniques, there has been a historical absence of AI solutions capable of achieving high accuracy at a room-level granularity or better while maintaining a location generation delay of under 10 seconds.

The disclosed examples provide an intelligent solution that addresses the above technical problems and challenges. Particularly, the disclosed technical solution leverages an AI solution (using one or more machine learning models) to address the trade-off between the accuracy of location estimation and the time required for location determination. This is achieved through a data-driven approach without necessitating supplementary hardware. Specifically, the disclosed techniques employ a Transformer Encoder Stack Neural Network model, which is trained in a self-supervised manner. This model is designed to conduct classification tasks and is configured to learn both temporal and spatial patterns inherent in the data. These patterns are subsequently associated with specific physical locations of interest, such as room level divisions. The model employs this acquired knowledge to predict future locations, hence reducing the time required for location determination.

Particularly, the disclosed techniques receive a plurality of Bluetooth Low Energy (BLE) signals (or other type of RF signal) from a BLE beacon (or any other RF transmission device) associated with an object over a period of time. The disclosed techniques generate a series of spatial patterns based on RSSI associated with the BLE signals. The disclosed techniques process the series of spatial patterns by a first machine learning model to select a portion of the series of spatial patterns for use in determining a location of the object. The disclosed techniques determine the location of the object based on the selected portion of the series of spatial patterns associated with the BLE signals.

In some cases, to enhance pattern discrimination, the disclosed techniques aggregate multiple timepoints, transforming individual instances into a spatiotemporal pattern. A deployment in a floor of a hospital, warehouse, or other site can be viewed as a physical space mapped by anchors. When a person or piece of equipment with a beacon is required to navigate to a specific room on this floor at a given time, they follow a particular path across the floor. Instead of estimating the beacon position using just the spatial pattern formed by the RSSI signals at a specific time, the disclosed techniques enrich the data sample by considering the spatial patterns formed by multiple timepoints along the beacon's historical trajectory. This series of spatial patterns, driven by RSSI signals, which represents the beacon's route to its current location, is termed a spatiotemporal pattern.

The ability to estimate locations rapidly and accurately opens up a multitude of applications previously unfeasible in a BLE-based RTLS. One notable application involves tracking wandering patients within a hospital environment. Hospitals maintain access-controlled environments, restricting patient entry to certain staff-only areas. However, it's common for patients to deviate from their designated zones; they may unintentionally wander, enter adjacent rooms, linger in hallways, or, in cases involving patients with memory or mental issues, stray unpredictably. The prompt and precise tracking of these patients becomes essential, necessitating real-time and accurate location tracking. This same principle extends to swiftly tracking distressed staff members equipped with staff beacons, which often include a panic button for use in threatening situations. Rapidly locating these staff members is critical for ensuring their safety. Furthermore, this application finds relevance in ensuring staff safety within hotel premises and similar business environments.

Another application of rapidly determining locations of objects using the disclosed machine learning models that arises is monitoring the service status of patients. Patients frequently request assistance by contacting staff, triggering an alert for the respective room where the patient is located. When a staff member enters the room and begins attending to the patient, it is crucial to promptly cancel the alert. This process ensures efficient allocation of resources and facilitates timely attendance to patients in need. Rapid and precise location estimation also facilitates per-minute resource billing. By tracking assets, staff, and patients, it becomes straightforward to correlate resource usage for a particular patient through the simultaneous presence of patients, assets, and staff in a given room. Moreover, by considering the room's purpose and the staff's roles, potential treatments can be deduced, thereby aiding in precise billing. Yet another application that becomes feasible involves tracking staff compliance with hand sanitation requirements. Utilizing real-time proximity data between staff and a soap dispenser module (housing an anchor that briefly reads BLE signals upon dispensing), the disclosed techniques accurately identify which staff members complied with handwashing requirements and which did not.

FIG. 1 is a block diagram showing an example location detection system 100, according to various examples. The location detection system 100 can include a client device 120 and anchor devices 110 that can be used to determine a location of one or more objects. The client device 120 and the anchor devices 110 are communicatively coupled over a network 130 (e.g., Internet, BLE, ultra-wideband (UWB) communication protocol, Near Field Communication (NFC), and/or telephony network).

The client device 120 and the anchor devices 110 can be communicatively coupled via electronic messages (e.g., packets exchanged over the Internet, BLE, UWB, NFC, WiFi direct or any other protocol). While FIG. 1 illustrates a single instance of the anchor devices 110 and a single client device 120, it is understood that a plurality of anchor devices 110 and a plurality of client devices 120 can be included in the location detection system 100 in other examples.

The anchor devices 110 can include any one or a combination of an IoT device, a database, a website, a server hosting a website at a URL address, a physical access control device, logical access control device, governmental entity device, ticketing event device, and residential smart lock and/or other Bluetooth or NFC or UWB based smart device. The anchor devices 110 can be any device that can observe a radio signal (e.g., RF signal and/or BLE signal) transmitted by an RF beacon of the client device 120, such as a BLE beacon. The anchor devices 110 can compute various features or characteristics of the radio signal, such as the RSSI, amplitude, attenuation, and so forth. In some cases, the radio signal includes information that identifies a type of the RF beacon that was used to transmit the RF signal.

In general, the anchor devices 110 can include one or more of a memory, a processor, one or more antennas, a communication module, a network interface device, a user interface, and a power source or supply. The memory of the anchor devices 110 can be used in connection with the execution of application programming or instructions by the processor of the anchor devices 110. For example, the memory can contain executable instructions that are used by the processor to run other components of anchor devices 110 and/or to determine locations of objects based on the RF signals transmitted by the client device 120.

The memory of the anchor devices 110 can comprise a computer-readable medium that can be any medium that can contain, store, communicate, or transport data, program code, or instructions for use by or in connection with anchor devices 110. The computer-readable medium can be, for example but is not limited to, an electronic, magnetic, optical, electromagnetic, infrared, or semiconductor system, apparatus, or device. More specific examples of suitable computer-readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device.

The processor of the anchor devices 110 can correspond to one or more computer processing devices or resources. For instance, the processor can be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor can be provided as a microprocessor, Central Processing Unit (CPU), or plurality of microprocessors or CPUs that are configured to execute instructions sets stored in an internal memory and/or memory of the anchor devices 110.

The antenna of the anchor devices 110 can correspond to one or multiple antennas and can be configured to provide for secure and/or unsecure wireless communications between anchor devices 110 and an RF beacon (e.g., client device 120). The antenna can be arranged to operate using one or more wireless communication protocols and operating frequencies including, but not limited to, the IEEE 802.15.1, Bluetooth, Bluetooth Low Energy (BLE), NFC, ZigBee, GSM, CDMA, Wi-Fi, RF, UWB, and the like. By way of example, the antenna(s) can be RF antenna(s), and as such, may transmit/receive RF signals through free-space to be received/transferred by a device having an RF transceiver.

A communication module of the anchor devices 110 can be configured to communicate according to any suitable communications protocol with one or more different systems or devices either remote or local to anchor devices 110, such as one or more client devices 120. In some cases, the communication module communicates over a secure channel (e.g., secure BLE or NFC channel) with a client device 120, in which case all of the exchanged data is encrypted (e.g., end-to-end). In some cases, the communication module communicates over an unsecure channel (e.g., unsecure, public or open BLE or NFC channel) with a client device 120, in which case all or a portion of the exchanged data is unencrypted.

The network interface device of the anchor devices 110 includes hardware to facilitate communications with other devices, such as a one or more client devices 120 over a communication network, such as network 130, utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device can include an Ethernet port or other physical jack, a Wi-Fi card, a Network Interface Card (NIC), a cellular interface (e.g., antenna, filters, and associated circuitry), or the like. In some examples, network interface device can include a plurality of antennas to wirelessly communicate using at least one of single-input multiple-output (SIMO), multiple-input multiple-output (MIMO), or multiple-input single-output (MISO) techniques.

A user interface of the anchor devices 110 can include one or more input devices and/or display devices. Examples of suitable user input devices that can be included in the user interface include, without limitation, one or more buttons, a keyboard, a mouse, a touch-sensitive surface, a stylus, a camera, a microphone, etc. Examples of suitable user output devices that can be included in the user interface include, without limitation, one or more LEDs, an LCD panel, a display screen, a touchscreen, one or more lights, a speaker, and so forth. It should be appreciated that the user interface can also include a combined user input and user output device, such as a touch-sensitive display or the like.

The network 130 may include, or operate in conjunction with, an ad hoc network, an intranet, an extranet, a virtual private network (VPN), a LAN, a wireless network, a wireless LAN (WLAN), a wide area network (WAN), a wireless WAN (WWAN), a metropolitan area network (MAN), BLE, UWB, the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other short range or long range protocols, or other data transfer technology.

In some examples, the anchor devices 110 are physically installed at different locations in a physical space, such as different rooms in a house or hospital. The anchor devices 110 periodically receive or observe RF signals transmitted by one or more client device 120. The anchor devices 110 aggregate these signals to generate a spatiotemporal pattern of an object to which the client device 120 is attached. The anchor devices 110 each compute an RSSI of the signals they receive. The anchor devices 110 associate different timestamps with each instance of the signals they receive from the RF beacons. These signals form a historical trajectory of the client device 120 that can be used to generate a spatiotemporal pattern for the object.

In some examples, the anchor devices 110 feed these signals to one or more machine learning models. The machine learning models process these signals (e.g., the spatiotemporal pattern signals or the RSSI signals observed by the various anchor devices 110 over a period of time). The one or more machine learning models can then identify certain portions of the signals that are more likely to represent a trajectory or location than other signals observed by the anchor devices 110. These identified portions of the signals are then processed, such as using triangulation processes, to determine an exact location or predicted location of the object associated with the RF beacon from which the signals were received.

Specifically, the spatiotemporal patterns can be linked to a specific position on a given floor and may manifest substantial divergence among themselves as well. This divergence can be attributed to the existence of multiple traversal paths leading to the same location, the variability in individuals' walking speeds, and the non-linear nature of human movement, which includes halts, turnarounds, cycles, and detours. Accurately categorizing such data requires a neural network that can focus on specific parts of the input sequence while disregarding others. Each input sample can include a long sequence of data, containing multiple halts, cycles, and detours. The neural network model can be trained to ignore these and focus on the effective path taken by the client device 120.

The client device 120 can include various types of RF beacons. For example, the client device 120 can be attached physically to a person, such as a patient and, in such cases, the client device 120 can be a wristband BLE beacon. The client device 120 can be attached physically to a medical professional or other staff member. In such cases, the client device 120 can be a physical badge BLE beacon. The client device 120 can be attached physically to any physical asset, such as a faucet or sink. In such cases, the client device 120 can be an asset BLE beacon. Different machine learning models can be trained to process spatiotemporal patterns observed by different types of RF beacons.

The anchor devices 110 can be distributed at various locations throughout a building, such as a shopping mall, hospital, home, and so forth. Each anchor devices 110 can be placed at a different room in the building and/or multiple anchor devices 110 can be placed in each room in the building. The anchor devices 110 periodically collect signals from the client device 120 and compute RSSI for the periodically collected signals. The anchor devices 110 can then build a history of signals that were collected during a particular time interval, where the history of signals includes an indication or timestamp when each sample in the history of signals was collected. The anchor devices 110 can build a pattern, such as a spatiotemporal pattern, that represents where the signals were collected, which anchor devices 110 collected the signals, and the time when the signals were collected. This data is usually very noisy and includes multiple conflicting measurements even when the client device 120 was stationary at a specific location. This can be due to variations in attenuation, body temperature, gate, movement, static, and so forth.

In order to accurately determine the current position of the client device 120, the spatiotemporal pattern may need to be smoothed. The disclosed techniques apply a trained machine learning model to the spatiotemporal pattern of signals to select a subset or portion of the signals that more accurately represent movement along a path. In some examples, multiple machine learning models can be trained each specific to a type of client device 120 (e.g., RF beacon) that is being used/tracked. Individual machine learning models for each beacon type can better handle variations than one single model encompassing all types of beacons. Creating separate models for each beacon type is feasible without incurring substantial additional costs, thereby optimizing performance for each category. This modular approach and adaptability extend to spatial division as well. Models can be fine-tuned for smaller areas such as wings or larger expanses like entire floors or multi-floor buildings. This customization is adaptable to meet specific user needs.

In some examples, the machine learning model applies various prioritization and weighting schemes to exclude certain portions of the signals and to select the subset of the portion of the signals. For example, the machine learning model can be trained to prioritize a first subset of spatial patterns in the series of spatial patterns (e.g., the spatiotemporal signals) associated with more recent timepoints, prioritize a second subset of spatial patterns in the series of spatial patterns associated with entry into a geofence associated with an anchor, and/or prioritize a third subset of spatial patterns in the series of spatial patterns associated with a workflow indicator.

In some cases, three distinct types of patterns hold significance in determining the accurate positioning of a beacon. In specific input sequences, spatial patterns near the current moment in time carry weight in determining the precise location. Consequently, the machine learning model may possess the capability to prioritize the present data while disregarding the historical data sequence. Should the pattern surrounding the beacon's entry into a room hold importance, the machine learning model may concentrate on that segment and discard the remainder. Moreover, if there exist workflow-oriented indicators within the input sample, these markers may appear dispersed across various sections within the extensive data sequence. In such scenarios, the machine learning model may adeptly discern the crucial patterns or markers and dismiss irrelevant data segments.

The machine learning model smooths the data and removes a great deal of noise. As such, the anchor devices 110 can then process the selected subset of portion of the signals to accurately and in real time determine the current location of the client device 120.

FIG. 2 is a block diagram of example components 200 of the location detection system 100, according to some examples. The components 200 can be part of the anchor devices 110 and/or the client device 120 and can include a beacon signal component 210, one or more machine learning models 220, a location determination component 230, and a communication device 240.

The communication device 240 can detect a signal from an RF beacon of the client device 120. For example, the client device 120 can periodically (e.g., every 30 seconds or other specified period of time) transmit/broadcast a packet of information. The communication device 240 of one or more anchors can detect this packet of information using a respective communication device 240. The packet of information can include a timestamp, an RF beacon identifier, an RF beacon type, and one or more data components. The communication device 240 can provide the data packet received from the RF beacon to the beacon signal component 210.

The beacon signal component 210 can compute an RSSI for the received signal. The beacon signal component 210 stores the RSSI in association with the timestamp and RF beacon identifier and/or RF beacon type. The beacon signal component 210 can, in this way, generate a table that lists various signals collected from the same RF beacon over a period of time (e.g., in the last 30 minutes). The beacon signal component 210 aggregates the information in the table periodically to generate a spatiotemporal pattern for the RF beacon.

The beacon signal component 210 can determine the beacon type associated with the spatiotemporal pattern of signals (e.g., the sequence of signal samples). The beacon signal component 210 can then select an individual machine learning model from the one or more machine learning models 220 based on the beacon type. For example, the beacon signal component 210 can determine that the beacon type corresponds to a first beacon type. In such cases, the one or more machine learning models 220 accesses a first machine learning model from the one or more machine learning models 220. As another example, the beacon signal component 210 can determine that the beacon type corresponds to a second beacon type. In such cases, the one or more machine learning models 220 accesses a second machine learning model from the one or more machine learning models 220. Namely, the beacon signal component 210 can determine that a second table associated with a different client device 120 and different spatiotemporal pattern corresponds to a second beacon type. In such cases, the beacon signal component 210 selects the second machine learning model from the one or more machine learning models 220.

The one or more machine learning models 220 can store parameters for multiple machine learning models each trained to select a portion of data from a spatiotemporal data set associated with a particular beacon type. Each of the one or more machine learning models 220 can be another instance of a Transformer Encoder Stack Neural Network model. In some cases, the Transformer Encoder Stack Neural Network model can be trained in an unsupervised approach using one or more training data sets. The data sets can be collected from different types of beacons and the corresponding Transformer Encoder Stack Neural Network model associated with the beacon type is trained. For example, a first training data set collected from a first beacon type can be used to train a first Transformer Encoder Stack Neural Network model corresponding to the first beacon type. For example, a second training data set collected from a second beacon type can be used to train a second Transformer Encoder Stack Neural Network model corresponding to the first beacon type.

The training operations can include receiving training data that includes a set of BLE signals (or RF signals) associated with historical patterns obtained from one or more BLE beacons (or other RF beacons) and a set of locations corresponding to the set of BLE signals (or RF signals). The Transformer Encoder Stack Neural Network model processes the training data to establish a relationship between historical patterns corresponding to portions of the set of BLE signals and the set of locations. Namely, the Transformer Encoder Stack Neural Network model can statistically analyze the pattern of data to discern which samples correspond to movement along a path and represent a location along a trajectory and which samples correspond to noise or duplicate data samples. The Transformer Encoder Stack Neural Network model is trained to predictively weigh and/or prioritize certain portions of the training date. Once trained, the Transformer Encoder Stack Neural Network model can identify spatiotemporal data samples that match a certain pattern of signals in the training data in order to select those certain portions of the data samples for further analysis to determine a current location of a beacon.

In some examples, a trained model (e.g., a trained Transformer Encoder Stack Neural Network) is created for each floor. RSSI data from beacons observed on that floor is collected over multiple days (or other suitable time period), resulting in a dataset that includes hundreds of millions of training samples sourced from thousands of beacons (e.g., BLE beacons of different types). The dataset is partitioned into subsets by grouping data based on the anchor with the highest RSSI for a data point. This partitioning scheme assists in ensuring a uniform distribution of data across the floor, thereby enhancing the model's exposure to representative samples. To provide context for path identification, each data sample is prefixed with historical points that are unique in terms of the anchor with the highest RSSI compared to the last 'n' significant historical points selected while others are discarded or assigned lower value weights. This forms a single training sample. For labeling, the subsequent 'm' timepoints are considered, and an average of RSSI values for each anchor in that window is computed. The anchor with the highest mean RSSI value is then chosen as the label for the training sample and the other RSSI values can be discarded. This associates anchors (e.g., locations) with each training RSSI data sample.

In another example, statistical post-processing is used to identify time windows during which the beacon remains stationary. Samples acquired during periods in which the beacon is in motion are assigned labels as previously described, while the label for all samples collected during a stationary time window is determined by selecting the anchor with the highest median RSSI value in that time window. Other samples can then be discarded if they are assigned weights that are less than a threshold value.

The selected or accessed machine learning model of the one or more machine learning models 220 is then applied to the spatiotemporal pattern of samples. The machine learning model can then smooth the data by removing some of the samples of RSSI that are in the spatiotemporal pattern of samples. This results in a subset or portion of the spatiotemporal pattern of samples being output by the selected or accessed machine learning model. The subset or portion of the spatiotemporal pattern of samples is then provided to the location determination component 230. The location determination component 230 can apply one or more techniques to predict or estimate a current location of the client device 120, such as by performing triangulation of samples collected by multiple anchors.

The determined location can then be used in various applications. For example, the determined location can be used to track wandering patients within a hospital environment. The prompt and precise tracking of these patients becomes essential, necessitating real-time and accurate location tracking. This same principle extends to swiftly tracking distressed staff members equipped with staff beacons, which often include a panic button for use in threatening situations. Rapidly locating these staff members is critical for ensuring their safety. Furthermore, the determined location can be used to ensure staff safety within hotel premises and similar environments.

Another application of rapidly determining locations of objects using the disclosed machine learning models that arises is monitoring the service status of patients. Patients frequently request assistance by contacting staff, triggering an alert for the respective room where the patient is located. When a staff member enters the room and begins attending to the patient, it is crucial to promptly cancel the alert. This process ensures efficient allocation of resources and facilitates timely attendance to patients in need. Rapid and precise location estimation also facilitates per-minute resource billing. By tracking assets, staff, and patients, it becomes straightforward to correlate resource usage for a particular patient through the simultaneous presence of patients, assets, and staff in a given room. Moreover, by considering the room's purpose and the staff's roles, potential treatments can be deduced, thereby aiding in precise billing. The determined location can be used to track staff compliance with hand sanitation requirements. Utilizing real-time proximity data between staff and a soap dispenser module (housing an anchor that briefly reads BLE signals upon dispensing), the disclosed techniques accurately identify which staff members complied with handwashing requirements and which did not.

FIG. 3 is a flowchart illustrating example process 300 of the location detection system 100, according to example embodiments. The process 300 may be embodied in computer-readable instructions for execution by one or more processors such that the operations of the process 300 may be performed in part or in whole by the functional components of the location detection system 100; accordingly, the process 300 is described below by way of example with reference thereto. However, in other embodiments, at least some of the operations of the process 300 may be deployed on various other hardware configurations. Some or all of the operations of process 300 can be in parallel, out of order, or entirely omitted.

At operation 301, the location detection system 100 receives a plurality of Bluetooth Low Energy (BLE) signals from a BLE beacon associated with an object over a period of time, as discussed above.

At operation 302, the location detection system 100 generates a series of spatial patterns based on Received Signal Strength Indicators (RSSI) associated with the plurality of BLE signals, as discussed above.

At operation 303, the location detection system 100 processes the series of spatial patterns by a first machine learning model to select a portion of the series of spatial patterns for use in determining a location of the object, as discussed above.

At operation 304, the location detection system 100 determines the location of the object based on the selected portion of the series of spatial patterns associated with the plurality of BLE signals, as discussed above.

EXAMPLES

Example 1. A method comprising: receiving a plurality of Bluetooth Low Energy (BLE) signals from a BLE beacon associated with an object over a period of time; generating a series of spatial patterns based on Received Signal Strength Indicators (RSSI) associated with the plurality of BLE signals; processing the series of spatial patterns by a first machine learning model to select a portion of the series of spatial patterns for use in determining a location of the object; and determining the location of the object based on the selected portion of the series of spatial patterns associated with the plurality of BLE signals.

Example 2. The method of Example 1, wherein the plurality of BLE signals is received by a plurality of anchors that are distributed in a physical space.

Example 3. The method of Example 2, wherein the BLE beacon emits periodic RF signals.

Example 4. The method of Example 3, further comprising: generating a first spatial pattern of the series of spatial patterns based on an RSSI of the periodic RF signals observed by the plurality of anchors at a first timepoint; and generating a second spatial pattern of the series of spatial patterns based on an additional RSSI of the periodic RF signals observed by the plurality of anchors at a second timepoint.

Example 5. The method of Example 4, further comprising: aggregating the first and second spatial patterns into a spatiotemporal pattern comprising the series of spatial patterns.

Example 6. The method of any one of Examples 1-5, wherein the series of spatial patterns represent a historical trajectory of the BLE beacon over the period of time.

Example 7. The method of any one of Examples 1-6, wherein the portion of the series of spatial patterns selected by the machine learning model represents a path taken by the BLE beacon.

Example 8. The method of any one of Examples 1-7, wherein the machine learning model is trained to prioritize a first subset of spatial patterns in the series of spatial patterns associated with more recent timepoints.

Example 9. The method of Example 8, wherein the machine learning model is trained to prioritize a second subset of spatial patterns in the series of spatial patterns associated with entry into a geofence associated with an anchor.

Example 10. The method of Example 9, wherein the machine learning model is trained to prioritize a third subset of spatial patterns in the series of spatial patterns associated with a workflow indicator.

Example 11. The method of any one of Examples 1-10, wherein the machine learning model comprises a Transformer Encoder Stack Neural Network model.

Example 12. The method of Example 11, wherein the Transformer Encoder Stack Neural Network model is trained to emphasize data sample features pertinent in determining a precise location of an individual BLE beacon at a given time instance.

Example 13. The method of any one of Examples 11-12, further comprising training the Transformer Encoder Stack Neural Network model in an unsupervised manner by performing training operations comprising: receiving training data including a set of BLE signals associated with historical patterns obtained from one or more BLE beacons; and processing the training data by the Transformer Encoder Stack Neural Network model to infer a location from the set of BLE signals by selecting the location of an anchor having a relatively stronger RSSI signal in the set of BLE signals from another RSSI signal associated with another timepoint in a sequence.

Example 14. The method of any one of Examples 1-13, further comprising: training a plurality of machine learning models comprising the first machine learning model to select different portions of an individual series of spatial patterns based on beacon types.

Example 15. The method of Example 14, further comprising: determining that the BLE beacon corresponds to a first type of BLE beacon; and selecting the first machine learning model from the plurality of machine learning models for processing the series of spatial patterns in response to determining that the BLE beacon corresponds to the first type of BLE beacon.

Example 16. The method of Example 15, further comprising: receiving an additional plurality of BLE signals from an additional BLE beacon; generating an additional series of spatial patterns based on RSSI associated with the additional plurality of BLE signals; determining that the additional BLE beacon corresponds to a second type of BLE beacon; and selecting a second machine learning model from the plurality of machine learning models for processing the additional series of spatial patterns in response to determining that the additional BLE beacon corresponds to the second type of BLE beacon.

Example 17. The method of Example 16, further comprising: processing the additional series of spatial patterns by the second machine learning model to select an additional portion of the additional series of spatial patterns for use in determining an additional location; and determining the additional location based on the selected additional portion of the additional series of spatial patterns associated with the additional plurality of BLE signals.

Example 18. The method of Example 17, wherein the additional location is determined by a real-time location system (RTLS), wherein the first type of BLE beacon comprises at least one of a wristband, a physical badge, or an object tag, and wherein the second type of BLE beacon comprises a different one of the wristband, the physical badge, or the object tag.

Example 19. A system comprising: one or more processors configured to perform operations comprising: receiving a plurality of Bluetooth Low Energy (BLE) signals from a BLE beacon associated with an object over a period of time; generating a series of spatial patterns based on Received Signal Strength Indicators (RSSI) associated with the plurality of BLE signals; processing the series of spatial patterns by a first machine learning model to select a portion of the series of spatial patterns for use in determining a location of the object; and determining the location of the object based on the selected portion of the series of spatial patterns associated with the plurality of BLE signals.

Example 20. A non-transitory computer-readable medium comprising non-transitory computer-readable instructions that, when executed by one or more processors, configure the one or more processors to perform operations comprising: receiving a plurality of Bluetooth Low Energy (BLE) signals from a BLE beacon associated with an object over a period of time; generating a series of spatial patterns based on Received Signal Strength Indicators (RSSI) associated with the plurality of BLE signals; processing the series of spatial patterns by a first machine learning model to select a portion of the series of spatial patterns for use in determining a location of the object; and determining the location of the object based on the selected portion of the series of spatial patterns associated with the plurality of BLE signals.

Figure 4:
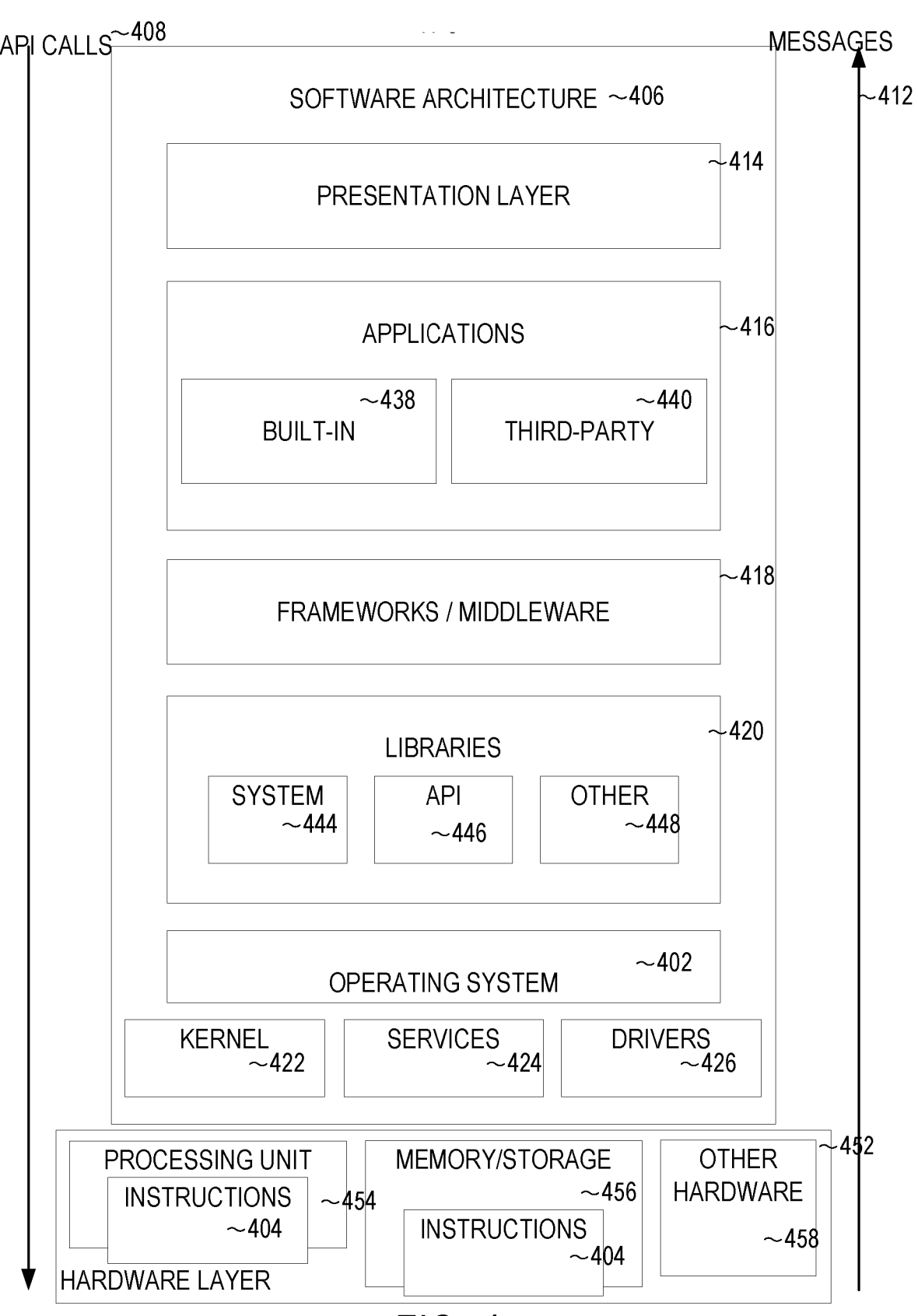
FIG. 4 is a block diagram illustrating an example software architecture, which may be used in conjunction with various hardware architectures herein described.

FIG. 4 is a block diagram illustrating an example software architecture 406, which may be used in conjunction with various hardware architectures herein described. FIG. 4 is a non-limiting example of a software architecture and it will be appreciated that many other architectures may be implemented to facilitate the functionality described herein. The software architecture 406 may execute on hardware such as machine 500 of FIG. 5 that includes, among other things, processors 504, memory 514, and input/output (I/O) components 518. A representative hardware layer 452 is illustrated and can represent, for example, the machine 500 of FIG. 5. The representative hardware layer 452 includes a processing unit 454 having associated executable instructions 404. Executable instructions 404 represent the executable instructions of the software architecture 406, including implementation of the methods, components, and so forth described herein. The hardware layer 452 also includes memory and/or storage devices memory/storage 456, which also have executable instructions 404. The hardware layer 452 may also comprise other hardware 458. The software architecture 406 may be deployed in any one or more of the components shown in FIG. 1.

In the example architecture of FIG. 4, the software architecture 406 may be conceptualized as a stack of layers where each layer provides particular functionality. For example, the software architecture 406 may include layers such as an operating system 402, libraries 420, frameworks/middleware 418, applications 416, and a presentation layer 414. Operationally, the applications 416 and/or other components within the layers may invoke API calls 408 through the software stack and receive messages 412 in response to the API calls 408. The layers illustrated are representative in nature and not all software architectures have all layers. For example, some mobile or special purpose operating systems may not provide a frameworks/middleware 418, while others may provide such a layer. Other software architectures may include additional or different layers.

The operating system 402 may manage hardware resources and provide common services. The operating system 402 may include, for example, a kernel 422, services 424, and drivers 426. The kernel 422 may act as an abstraction layer between the hardware and the other software layers. For example, the kernel 422 may be responsible for memory management, processor management (e.g., scheduling), component management, networking, security settings, and so on. The services 424 may provide other common services for the other software layers. The drivers 426 are responsible for controlling or interfacing with the underlying hardware. For instance, the drivers 426 include display drivers, camera drivers, BLE drivers, UWB drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 420 provide a common infrastructure that is used by the applications 416 and/or other components and/or layers. The libraries 420 provide functionality that allows other software components to perform tasks in an easier fashion than to interface directly with the underlying operating system 402 functionality (e.g., kernel 422, services 424 and/or drivers 426). The libraries 420 may include system libraries 444 (e.g., C standard library) that may provide functions such as memory allocation functions, string manipulation functions, mathematical functions, and the like. In addition, the libraries 420 may include API libraries 446 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 420 may also include a wide variety of other libraries 448 to provide many other APIs to the applications 416 and other software components/devices.

The frameworks/middleware 418 (also sometimes referred to as middleware) provide a higher-level common infrastructure that may be used by the applications 416 and/or other software components/devices. For example, the frameworks/middleware 418 may provide various graphic user interface functions, high-level resource management, high-level location services, and so forth. The frameworks/middleware 418 may provide a broad spectrum of other APIs that may be utilized by the applications 416 and/or other software components/devices, some of which may be specific to a particular operating system 402 or platform.

The applications 416 include built-in applications 438 and/or third-party applications 440. Examples of representative built-in applications 438 may include, but are not limited to, a contacts application, a browser application, a book reader application, a location application, a media application, a messaging application, and/or a game application. Third-party applications 440 may include an application developed using the ANDROID™ or IOS™ software development kit (SDK) by an entity other than the vendor of the particular platform, and may be mobile software running on a mobile operating system such as IOS™, ANDROID™ WINDOWS® Phone, or other mobile operating systems. The third-party applications 440 may invoke the API calls 408 provided by the mobile operating system (such as operating system 402) to facilitate functionality described herein.

The applications 416 may use built-in operating system functions (e.g., kernel 422, services 424, and/or drivers 426), libraries 420, and frameworks/middleware 418 to create UIs to interact with users of the system. Alternatively, or additionally, in some systems, interactions with a user may occur through a presentation layer, such as presentation layer 414. In these systems, the application/component "logic" can be separated from the aspects of the application/component that interact with a user.

Figure 5:
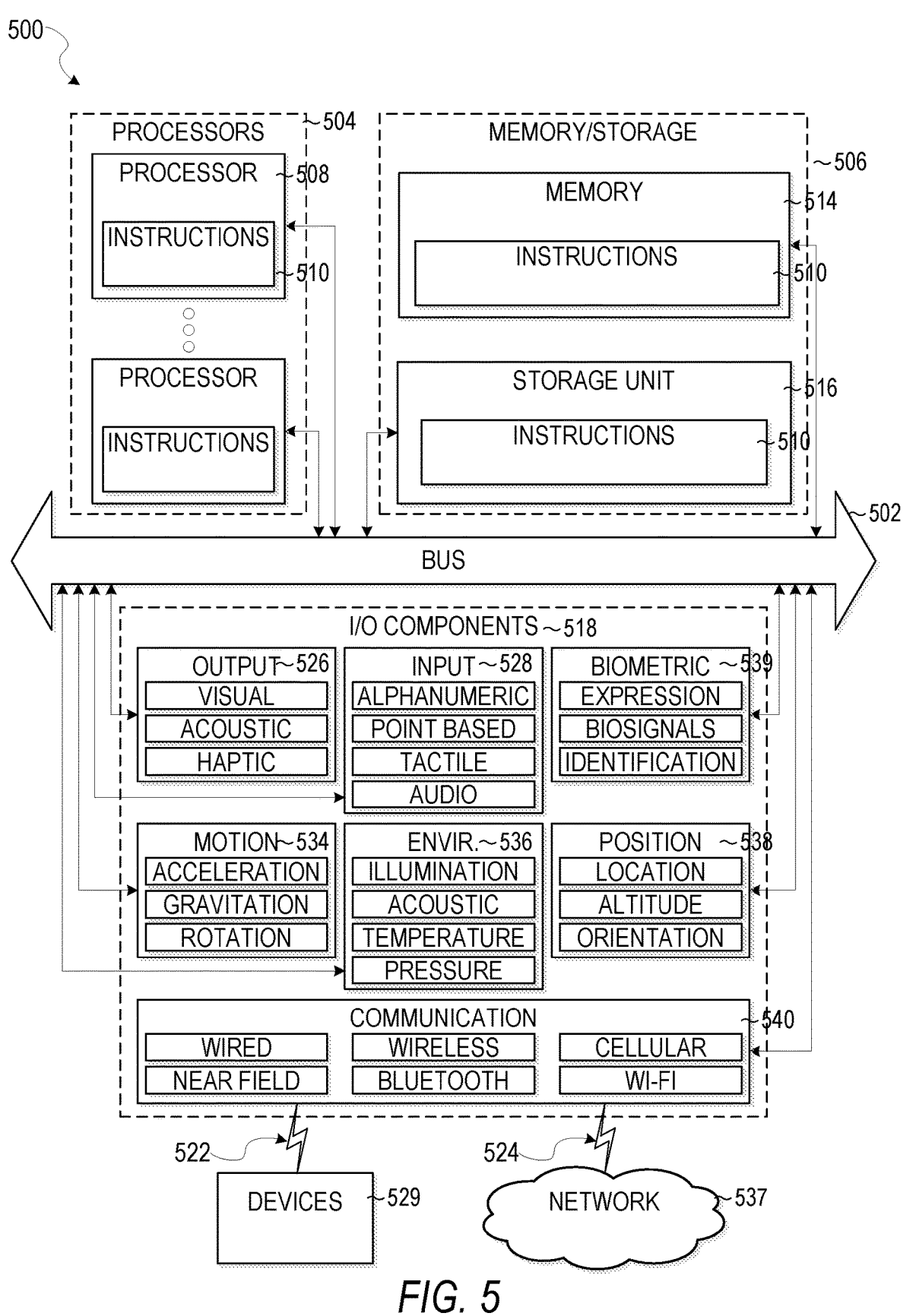
FIG. 5 is a block diagram illustrating components of a machine, according to some example embodiments.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 510 (e.g., software, a program, an application, an applet, an app, or other executable code) for causing the machine 500 to perform any one or more of the methodologies discussed herein may be executed.

As such, the instructions 510 may be used to implement devices or components described herein. The instructions 510 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 510, sequentially or otherwise, that specify actions to be taken by machine 500. Further, while only a single machine 500 is illustrated, the term "machine" shall also be taken to include a collection of machines that individually or jointly execute the instructions 510 to perform any one or more of the methodologies discussed herein.

The machine 500 may include processors 504, memory/storage 506, and I/O components 518, which may be configured to communicate with each other such as via a bus 502. In an example embodiment, the processors 504 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 508 and a processor that may execute the instructions 510. The term "processor" is intended to include multi-core processors 504 that may comprise two or more independent processors (sometimes referred to as "cores") that may execute instructions contemporaneously. Although FIG. 5 shows multiple processors 504, the machine 500 may include a single processor with a single core, a single processor with multiple cores (e.g., a multi-core processor), multiple processors with a single core, multiple processors with multiple cores, or any combination thereof.

The memory/storage 506 may include a memory 514, such as a main memory, or other memory storage, instructions 510, and a storage unit 516, both accessible to the processors 504 such as via the bus 502. The storage unit 516 and memory 514 store the instructions 510 embodying any one or more of the methodologies or functions described herein. The instructions 510 may also reside, completely or partially, within the memory 514, within the storage unit 516, within at least one of the processors 504 (e.g., within the processor's cache memory), or any suitable combination thereof, during execution thereof by the machine 500.

Accordingly, the memory 514, the storage unit 516, and the memory of processors 504 are examples of machine-readable media.

The I/O components 518 may include a wide variety of components to receive input, provide output, produce output, transmit information, exchange information, capture measurements, and so on. The specific I/O components 518 that are included in a particular machine 500 will depend on the type of machine. For example, portable machines such as mobile phones will likely include a touch input device or other such input mechanisms, while a headless server machine will likely not include such a touch input device. It will be appreciated that the I/O components 518 may include many other components that are not shown in FIG. 5. The I/O components 518 are grouped according to functionality merely for simplifying the following discussion and the grouping is in no way limiting. In various example embodiments, the I/O components 518 may include output components 526 and input components 528. The output components 526 may include visual components (e.g., a display such as a plasma display panel (PDP), a LED display, a LCD, a projector, or a cathode ray tube (CRT)), acoustic components (e.g., speakers), haptic components (e.g., a vibratory motor, resistance mechanisms), other signal generators, and so forth. The input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 518 may include biometric components 539, motion components 534, environmental components 536, or position components 538, among a wide array of other components. For example, the biometric components 539 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 534 may include acceleration sensor components (e.g., accelerometer), gravitation sensor components, rotation sensor components (e.g., gyroscope), and so forth. The environmental components 536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 518 may include communication components 540 operable to couple the machine 500 to a network 537 or devices 529 via coupling 524 and coupling 522, respectively. For example, the communication components 540 may include a network interface component or other suitable device to interface with the network 537. In further examples, communication components 540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 529 may be another machine or any of a wide variety of peripheral devices (e.g., a peripheral device coupled via a USB).

Moreover, the communication components 540 may detect identifiers or include components operable to detect identifiers. For example, the communication components 540 may include RFID tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540, such as location via Internet Protocol (IP) geo-location, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"COMMUNICATIONS NETWORK" in this context refers to one or more portions of a network that may be an ad hoc network, an intranet, an extranet, a VPN, a LAN, a BLE network, a UWB network, a WLAN, a WAN, a WWAN, a metropolitan area network (MAN), the Internet, a portion of the Internet, a portion of the PSTN, a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions and data temporarily or permanently and may include, but is not limited to, RAM, ROM, buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a FPGA or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

Changes and modifications may be made to the disclosed embodiments without departing from the scope of the present disclosure. These and other changes or modifications are intended to be included within the scope of the present disclosure, as expressed in the following claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method comprising:
   receiving a plurality of Bluetooth Low Energy (BLE) signals from a BLE beacon associated with an object over a period of time;
   generating a series of spatial patterns based on Received Signal Strength Indicators (RSSI) associated with the plurality of BLE signals;
   processing the series of spatial patterns by a first machine learning model comprising a Transformer Encoder Stack Neural Network model to select a portion of the series of spatial patterns for use in determining a location of the object, the Transformer Encoder Stack Neural Network model statistically analyzing the series of spatial patterns to discern which samples correspond to movement along a path and represent a location along a trajectory and which samples correspond to noise or duplicate data samples; and
   determining the location of the object based on the selected portion of the series of spatial patterns associated with the plurality of BLE signals.

2. The method of claim 1, wherein the plurality of BLE signals is received by a plurality of anchors that are distributed in a physical space.

3. The method of claim 2, wherein the BLE beacon emits periodic RF signals.

4. The method of claim 3, further comprising:

generating a first spatial pattern of the series of spatial patterns based on an RSSI of the periodic RF signals observed by the plurality of anchors at a first timepoint; and generating a second spatial pattern of the series of spatial patterns based on an additional RSSI of the periodic RF signals observed by the plurality of anchors at a second timepoint.

5. The method of claim 4, further comprising:

aggregating the first and second spatial patterns into a spatiotemporal pattern comprising the series of spatial patterns.

6. The method of claim 1, further comprising training the Transformer Encoder Stack Neural Network model in an unsupervised manner.

7. The method of claim 1, wherein the Transformer Encoder Stack Neural Network model is trained by performing training operations comprising:

processing training data by the Transformer Encoder Stack Neural Network model to infer a location from a set of BLE signals by selecting the location of an anchor having a relatively stronger RSSI signal in the set of BLE signals from another RSSI signal associated with another timepoint in a sequence.

8. The method of claim 1, wherein the machine learning model is trained to prioritize a first subset of spatial patterns in the series of spatial patterns associated with more recent timepoints.

9. The method of claim 8, wherein the machine learning model is trained to prioritize a second subset of spatial patterns in the series of spatial patterns associated with entry into a geofence associated with an anchor.

10. The method of claim 9, wherein the machine learning model is trained to prioritize a third subset of spatial patterns in the series of spatial patterns associated with a workflow indicator.

11. The method of claim 1, wherein the Transformer Encoder Stack Neural Network model is trained to emphasize data sample features pertinent in determining a precise location of an individual BLE beacon at a given time instance.

12. The method of claim 1, further comprising training the Transformer Encoder Stack Neural Network model in an unsupervised manner by performing training operations comprising:

receiving training data including a set of BLE signals associated with historical patterns obtained from one or more BLE beacons; and processing the training data by the Transformer Encoder Stack Neural Network model to infer a location from the set of BLE signals by selecting the location of an anchor having a relatively stronger RSSI signal in the set of BLE signals from another RSSI signal associated with another timepoint in a sequence.

13. The method of claim 1, further comprising:

training a plurality of machine learning models comprising the first machine learning model to select different portions of an individual series of spatial patterns based on beacon types.

14. The method of claim 13, further comprising:

determining that the BLE beacon corresponds to a first type of BLE beacon; and selecting the first machine learning model from the plurality of machine learning models for processing the series of spatial patterns in response to determining that the BLE beacon corresponds to the first type of BLE beacon.

15. The method of claim 14, further comprising:

receiving an additional plurality of BLE signals from an additional BLE beacon;

generating an additional series of spatial patterns based on RSSI associated with the additional plurality of BLE signals;

determining that the additional BLE beacon corresponds to a second type of BLE beacon; and selecting a second machine learning model from the plurality of machine learning models for processing the additional series of spatial patterns in response to determining that the additional BLE beacon corresponds to the second type of BLE beacon.

16. The method of claim 15, further comprising:

processing the additional series of spatial patterns by the second machine learning model to select an additional portion of the additional series of spatial patterns for use in determining an additional location; and determining the additional location based on the selected additional portion of the additional series of spatial patterns associated with the additional plurality of BLE signals.

17. The method of claim 16, wherein the additional location is determined by a real-time location system (RTLS), wherein the first type of BLE beacon comprises at least one of a wristband, a physical badge, or an object tag, and wherein the second type of BLE beacon comprises a different one of the wristband, the physical badge, or the object tag.

18. A system comprising:

one or more processors configured to perform operations comprising:

receiving a plurality of Bluetooth Low Energy (BLE) signals from a BLE beacon associated with an object over a period of time;

generating a series of spatial patterns based on Received Signal Strength Indicators (RSSI) associated with the plurality of BLE signals;

processing the series of spatial patterns by a first machine learning model comprising a Transformer Encoder Stack Neural Network model to select a portion of the series of spatial patterns for use in determining a location of the object, the Transformer Encoder Stack Neural Network model statistically analyzing the series of spatial patterns to discern which samples correspond to movement along a path and represent a location along a trajectory and which samples correspond to noise or duplicate data samples; and determining the location of the object based on the selected portion of the series of spatial patterns associated with the plurality of BLE signals.

19. A non-transitory computer-readable medium comprising non-transitory computer-readable instructions that, when executed by one or more processors, configure the one or more processors to perform operations comprising:

receiving a plurality of Bluetooth Low Energy (BLE) signals from a BLE beacon associated with an object over a period of time;

generating a series of spatial patterns based on Received Signal Strength Indicators (RSSI) associated with the plurality of BLE signals;

processing the series of spatial patterns by a first machine learning model comprising a Transformer Encoder Stack Neural Network model to select a portion of the series of spatial patterns for use in determining a location of the object, the Transformer Encoder Stack Neural Network model statistically analyzing the series of spatial patterns to discern which samples correspond to movement along a path and represent a location 5 along a trajectory and which samples correspond to noise or duplicate data samples; and determining the location of the object based on the selected portion of the series of spatial patterns associated with the plurality of BLE signals. 10

\* \* \* \* \*